May 24, 1955  R. W. HAUTZENROEDER  2,709,117
TRACK ATTACHMENT FOR WHEELED TRACTORS
Filed Nov. 1, 1952  2 Sheets-Sheet 1

INVENTOR.
RICHARD W. HAUTZENROEDER
BY Carlson, Pitzner,
Hubbard & Wolfe
ATTORNEYS.

May 24, 1955
R. W. HAUTZENROEDER
2,709,117
TRACK ATTACHMENT FOR WHEELED TRACTORS
Filed Nov. 1, 1952
2 Sheets-Sheet 2
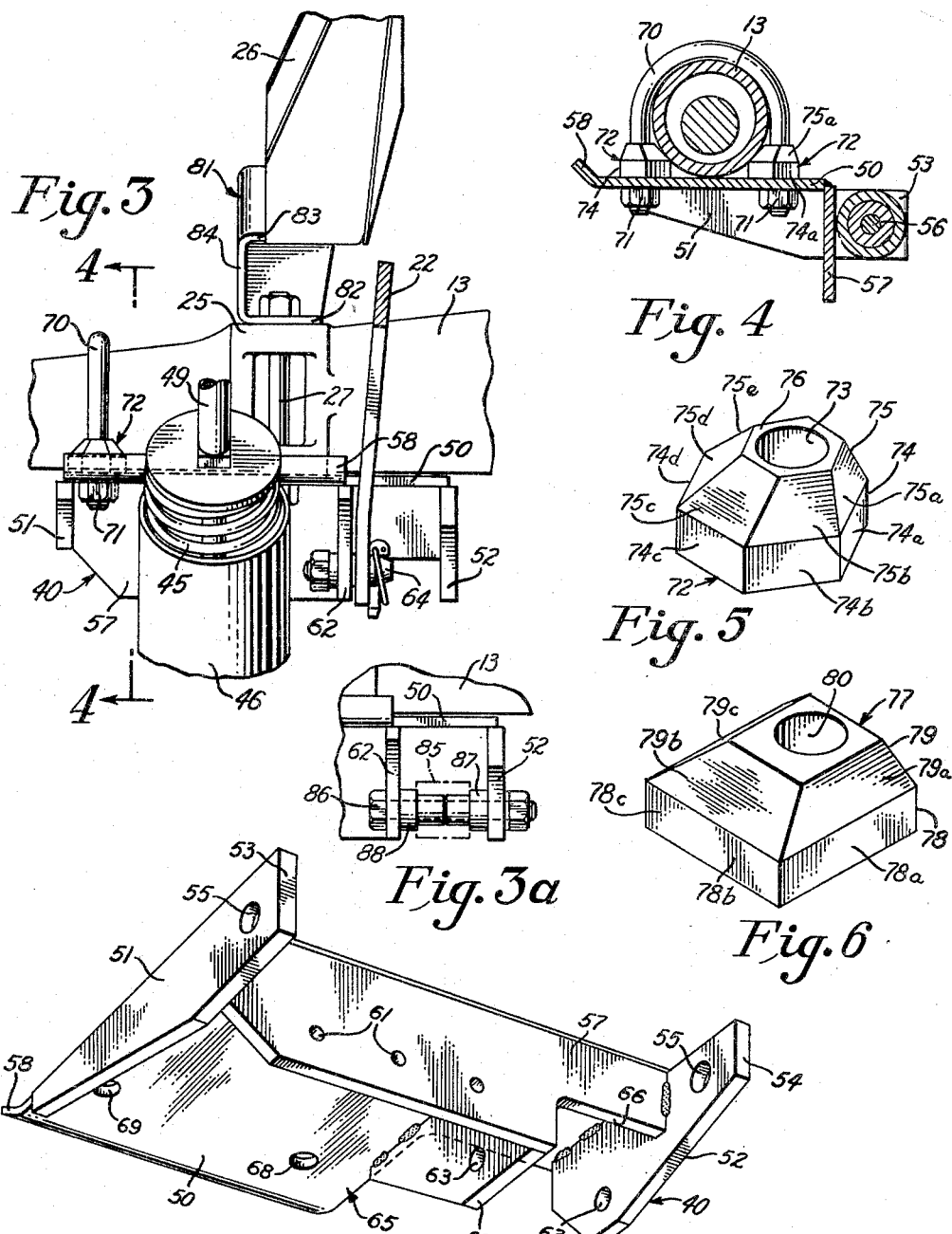
INVENTOR.
RICHARD W. HAUTZENROEDER
BY Carlson, Pitzner, Hibbard & Wolfe
ATTORNEYS.

United States Patent Office 2,709,117
Patented May 24, 1955

2,709,117

TRACK ATTACHMENT FOR WHEELED TRACTORS

Richard W. Hautzenroeder, Detroit, Mich., assignor to Harry Ferguson, Inc., Detroit, Mich., a corporation of Delaware Application November 1, 1952, Serial No. 318,220

3 Claims. (Cl. 305—8)

The invention relates to track attachments for wheeled tractors and is more particularly concerned with the mounting of such attachments on the tractor.

Track attachments of the above general character commonly comprise an endless traction belt or track for each driving wheel of the tractor and a bogey or idler wheel for supporting and guiding the front end of the track. The idler wheels are carried by independent supporting structures secured to the rear axle housings of the tractor and the wheels are spring biased to maintain the track under tension and to hold its forward end in engagement with the ground. The two wheels coacting with each track, that is, the tractor drive wheel and the idler wheel, hold the track in a position to define a generally flat ground contacting surface of relatively large area which affords increased flotation and better traction than the tractor drive wheels alone.

With track attachments heretofore available considerable difficulty has been experienced in initially lining up the idler wheels and maintaining them alined with the tractor drive wheels with the degree of precision necessary to prevent the tracks from slipping off when the tractor is driven. It should be borne in mind that the tractors with which such attachments are used have no special provisions for their accommodation. Practical considerations dictate the use of clamping means for securing the idler wheel supporting structures to the tractor, since the attachments are usually only required temporarily as when soft ground conditions or other considerations make the conventional wheel drive impractical. Furthermore, installation is usually made at home by the owner or operator of the tractor who has only the simplest tools available for the job.

With the above in view, one object of the invention is to provide an improved mounting for the idler wheel supporting structures of the track attachment which makes it much easier to line up the idler wheels when the attachment is installed and which effectively maintains those wheels in proper alinement with the tractor drive wheels under even the most severe working conditions.

Another object is to provide an idler wheel supporting bracket which can be mounted on the rear axle housing of a tractor without interfering in any way with the operation of the implements and mechanisms commonly used on or with the tractor and which embodies novel features of construction that considerably simplify the job of mounting the bracket and accurately alining the idler wheel with the tractor drive wheel with which it cooperates.

Other objects and advantages of the invention will become apparent from the following detailed description of the preferred embodiment illustrated in the accompanying drawings in which:

Fig. 3 is a fragmentary sectional view taken in a vertical plane substantially on the line 3—3 of Fig. 2 showing details of the supporting bracket and biasing spring assembly for the idler wheel.

Fig. 3a is a sectional view of a portion of the supporting bracket shown in Fig. 3 illustrating the use of a connection for a front end loader.

Fig. 4 is a transverse sectional view through the tractor axle housing and idler wheel supporting bracket taken in a vertical plane substantially on the line 4—4 of Fig. 3.

Fig. 5 is a perspective view of one of the spacer elements for adjustably positioning the idler wheel supporting bracket with respect to the tractor axle housing.

Fig. 6 is a perspective view of a modified form of the spacer element.

Fig. 7 is a perspective view of a right-hand supporting bracket as viewed from the underside.

While I have shown and will describe herein in detail a preferred form of the invention, it is to be understood that it is not intended to limit the invention to the precise form illustrated but, on the contrary, it is intended to cover all changes, modifications and alternative constructions falling within the spirit and scope of the invention as expressed in the appended claims.

Figure 1:
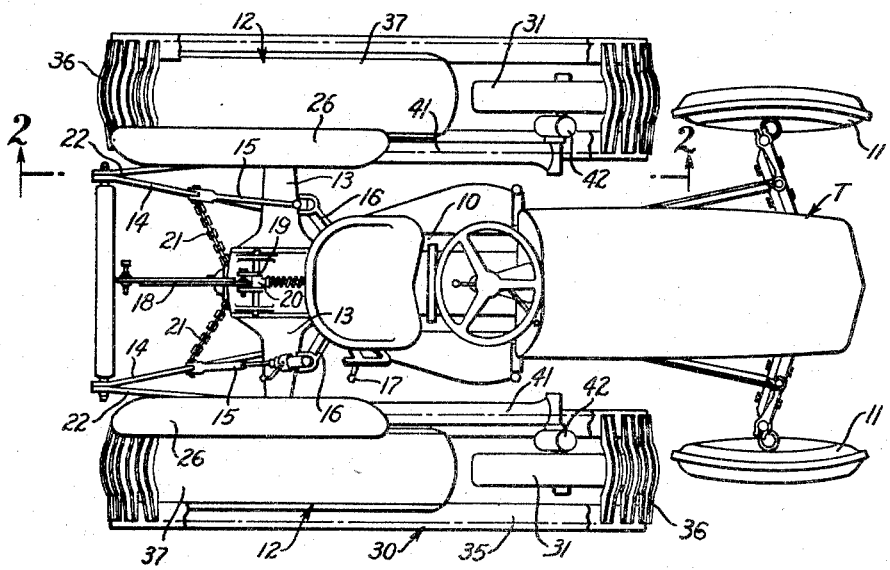
Figure 1 is a plan view of a four-wheel tractor equipped with a track attachment embodying the features of the invention.
Figure 2:
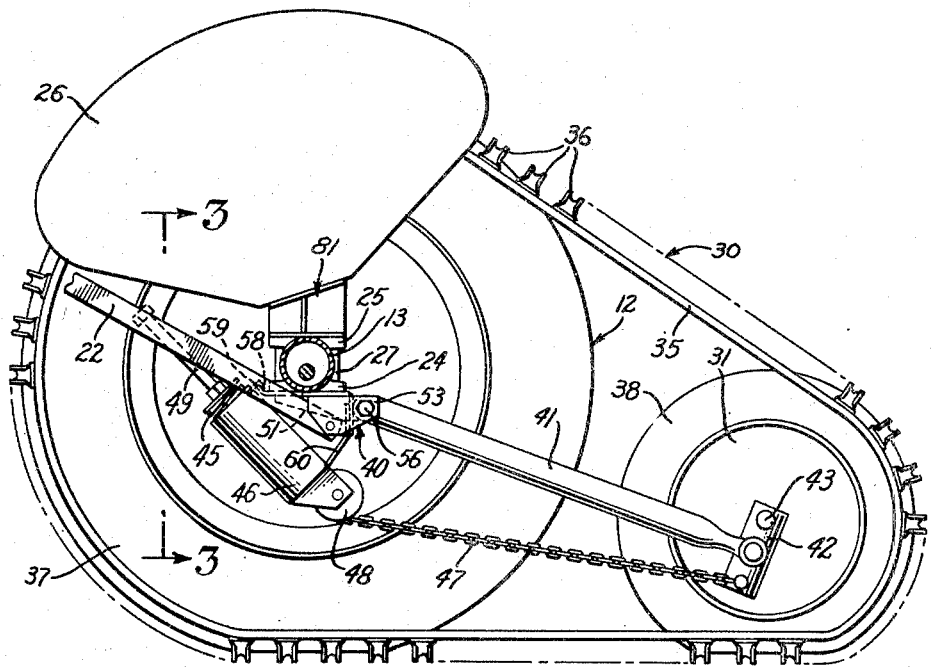
Fig. 2 is a sectional view taken in a vertical plane substantially on the line 2—2 of Figure 1 showing one of the tractor wheels with the track attachment applied thereto.

Referring now to Figs. 1 and 2 of the drawings, the invention has been shown herein as applied to a conventional four-wheeled tractor T which will be recognized as a Ferguson tractor. This tractor has an elongated body 10 supported by two dirigible front wheels 11 and two rear wheels 12, the latter being the driving wheels. The drive wheels 12 are carried on rear axle housings 13 projecting from opposite sides of the tractor body adjacent its rear end.

For the attachment of implements, tractors of the above type are equipped with a power operated hitch linkage including a pair of lower draft links 14 trailingly pivoted for universal movement on the axle housings 13 below and slightly forward of the central axis of the housings. The draft links are supported by drop links 15 from crank arms 16 at opposite ends of a shaft (not shown) journaled on the tractor body and adapted to be rocked by a power unit enclosed in the tractor body to raise and lower the draft links. Control of the power unit is effected in well-known manner through the joint action of a hand lever 17 and a top link 18 adapted to be connected between the implement connected to the draft links and a rocker member or shackle 19 pivoted on the tractor and operatively connected with a spring biased control plunger 20.

The universal pivotal mounting of the draft links 14 permits lateral swinging of an attached implement within the limits defined by a pair of check chains 21 which is advantageous in the case of certain types of implements. There are some types of implements, however, that must be held against lateral swinging and when such implements are connected to the tractor the swinging is restrained by stabilizer bars 22 (Figs. 2 and 3) removably secured between the outer or free ends of the draft links and suitable brackets (not shown) provided on the tractor axle housings. For the accommodation of the stabilizer bar brackets, the axle housings are commonly formed with downwardly facing flat pads 24 and similar upwardly facing flat pads 25 directly above the pads 24, provided for mounting the fenders 26. Both pads are usually extended beyond the sides of the axle housings and apertured at opposite ends for the reception of bolts 27 by which the brackets and fenders are secured in place.

Track attachments for use on such tractors comprise two track units of substantially similar form but arranged respectively for use on the right and left drive wheels of the tractor. Briefly, each unit comprises an endless flexible track element 30 adapted to be trained around the pneumatic tired tractor drive wheel 12 and over a bogey or idler wheel 31 located forwardly of the drive wheel. The idler wheel 31 is supported from one of the axle housings 13 so that it can swing up and down as well as forwardly and rearwardly and is spring biased so as to maintain the track element taut and to hold its forward end against the ground.

Turning now to a more detailed description of the exemplary track attachment and referring to Figs. 1 and 2 of the drawings, it will be observed that each of the track elements 30 is made up of two endless flexible belts 35 arranged in side-by-side relation and connected at relatively close intervals by steel cross links 36. These links have their inner faces arcuately shaped to conform generally to the contour of the tire 37 with which the drive wheel 12 is equipped and their outer faces formed to effectively grip the surface over which the tractor is being driven. The idler wheels 31 are also desirably fitted with pneumatic tires 38 which, it will be noted, are of substantially smaller diameter than the drive wheel tires.

Support for the two idler wheels 31 is provided by supporting structures which are alike in construction except that one is designed for use at the left-hand side of the tractor and the other for use at the right-hand side. In view of this similarity, a description of one of the support structures, such as the left-hand structure shown in Fig. 2, will suffice. Briefly it comprises a bracket 40 adapted to be removably secured to the tractor axle housing 13 as will be described in greater detail hereinafter. This bracket pivotally supports one end of a rigid tubular arm 41 projecting generally forwardly from the axle housing. Pivoted intermediate its ends at the outer end of the arm 41 is a cross member 42 which, at its upper end, carries a laterally projecting spindle 43 upon which the idler wheel 31 is journaled.

This spring biasing means for the idler wheel is arranged to urge the idler wheel 31 forwardly to maintain the track element 30 under tension and downwardly to hold it in contact with the ground. This spring means includes a coiled compression spring 45 (Figs. 2 and 3) enclosed within a cylindrical housing 46 supported on the bracket 40. The spring is operatively connected by a flexible element such as a chain 47 with the lower end of the spindle carrying cross arm 42. As herein shown, the chain 47 is carried over a direction changing sheave 48 rotatably supported at the lower end of housing 46. An adjusting screw 49 affords convenient means for adjusting the spring tension on the chain.

The mounting of the idler wheel supporting structure on the tractor and the alinement of the idler wheel with the tractor drive wheel is greatly facilitated by the improved construction of the bracket 40 and the novel means provided for attaching it to and positioning it with respect to the axle housing as contemplated by the present invention. Referring to Figs. 2, 3, and 7 of the drawings, the bracket 40 in its preferred form comprises a flat generally rectangular steel plate 50 adapted to fit flush against the lower pad 24 on the axle housing after the stabilizer bracket has been removed therefrom. Flange elements 51 and 52 depending from opposite ends of the plate may be formed integrally therewith or welded thereto as shown. The flange elements are extended beyond the forward edge of the plate 50 to define spaced ears 53 and 54 apertured as at 55 to receive a pin 56 (Figs. 2 and 4) by which the arm 41 is pivotally secured to the bracket. It should be noted that Fig. 7 shows a right-hand bracket while Figs. 2 and 3 show the left-hand bracket.

Extending between the flanges 51 and 52 along the front edge of the plate 50 and secured to each of those elements as by welding is a vertical flange element 57 which cooperates with an upturned lip 58 on the rear edge of the plate 50 to support the spring housing 46. For this purpose the housing 46 is provided at its upper end with a hook element 59 adapted to engage over the lip as shown in Fig. 2. A supporting plate 60 welded or otherwise attached to the housing 46 adjacent its lower end extends upwardly at an angle and has its end portion bent inwardly to lie flush against the rear face of the flange 57. The plate and flange are rigidly secured together by bolts or the like inserted through holes 61 in the flange and registering holes in the plate 60.

The bracket 40 is also arranged to perform the functions of the stabilizer bracket which it replaces or alternately to perform the additional function of supporting one arm of a front end loader. To this end the central portion of the flange 52 is extended downwardly and a flange element 62 is welded to the bottom of the plate 50 and the flange 57 in parallel spaced relation to the flange 52. Aperture 63 in flange 62 provides for attachment of the stabilizer bar by means of a pin 64 (Fig. 3). Apertures 63 in flanges 52 and 62 provide for attachment of a front end loader arm indicated at 85 by means of a through bolt 86 mounting spacer bearings 87—88 on which the loader arm is assembled. To permit movement of the hitch linkage and stabilizer bar through their full working range without interference, the bracket plate 50 is recessed as at 65 along its inner rear edge and the flange 57 is recessed as at 66 between the flanges 52 and 62.

Both the right-hand and left-hand bracket 40 is secured to the tractor axle housing 13 in the same way. For this purpose the plate 50 is formed with a pair of bolt holes 68 located near the center line of the bracket and spaced apart to receive the bolts 27 which normally secure the stabilizer bracket in place. The holes 68 are somewhat larger in diameter than the bolts to allow the bracket to swivel through an angle sufficient to allow alinement of the idler wheel with the tractor drive wheel when the track attachment is installed.

A second pair of bolt holes 69 adjacent the outer end of the plate are spaced apart to receive the legs of a U-bolt 70 adapted to straddle the axle housing 13 as shown in Figs. 3 and 4. The U-bolt being shaped to conform to the axle housing 13 may be cocked to one side or the other of a neutral vertical position for the swiveling adjustment of the bracket 40 above mentioned. Nuts 71 threaded on the ends of the U-bolt legs clamp the bracket securely to the axle housing.

The location of the ears 53 and 54 and their pivot pin apertures 55 are such that the idler wheel carrying arm is supported to pivot about an axis parallel to the front edge of the bracket plate 50 with the arm extending generally forwardly therefrom. The position of the idler wheel 31 is therefore adjustable laterally of the tractor to aline it with the tractor drive wheel 12 by swiveling the bracket 40 with respect to the axle housing 13. To facilitate this adjustment when installing the track attachment and to maintain it effectively during operation of the tractor, spacer elements 72 having a plurality of progressively spaced locating faces are provided for interposition between the legs of the U-bolt 70 and the axle housing 13.

Referring now to Figs. 4 and 5 of the drawings, in its preferred form, the spacer element 72 comprises a hexagonal metal block having an eccentrically located aperture 73 for the passage of one leg of the U-bolt 70. The block thus presents six vertically disposed flat locating faces 74, 74a, 74b, 74c, 74d and 74e spaced progressively varying distances from the axis of the block. As an additional refinement, the upper portion of the block may be beveled to present six inclined faces 75, 75a, 75b, 75c, 75d and 75e sloping upwardly from each vertical face to the top surface 76 of the block. The spacers, however, will operate satisfactorily without beveling.

In the installation of the bracket 40 one of the spacer elements 72 is placed on each leg of the U-bolt between the plate 50 and the axle housing 13, as shown in Fig. 4. The spacer elements are then turned until one face engages the axle housing when the bracket is in the angular position in which it is to be held. Thus for locating the bracket in one extreme angular position with reference to the axle housing, the spacer element on the rear leg of the U-bolt may be positioned to present its outermost faces 74c and 75c toward the axle housing while the companion element on the front leg may be positioned to present its innermost faces 74 and 75 to the housing. By turning the spacers step-by-step to present successive faces to the axle housing, the angular position of the bracket may be progressively changed through substantially parallel alinement with the axle housing to maximum angular displacement at the opposite side of the axle housing. When the nuts 71 are tightened, the sloping faces of the spacers are firmly clamped against the axle housing and the bracket 40. Tightening of the nuts on the bolts 27 accordingly rigidly secures the bracket in the position determined by the selective positioning of the spacers. It is evident, of course, that due to irregularities of the housing and associated parts the faces of the two spacer elements are not always used in complementary fashion. That is, in a particular instance noncomplementary faces may be used for proper alinement as shown in Fig. 4.

The modified form of spacer element 77 shown in Fig. 6 of the drawings differs from the element 72 in that it is formed with four sets of locating faces instead of six. Thus there are four vertical faces 78, 78a, 78b and 78c and four inclined faces 79, 79a, 79b and 79c. The latter, of course, may be omitted if desired. The bolt hole 80 is eccentrically positioned to locate those faces progressively varying distances from the axis of the element. It will be evident therefore that this spacer element operates in the same manner as the element 72 above described but with fewer steps.

The presence of the track attachment, particularly with some tread adjustments of the tractor wheels, may require a change in the position of the fenders 26. Accordingly, the present invention provides auxiliary fender brackets 81 adapted to be mounted on the fender pads 25 of the axle housings and to be secured thereto by the bolts 27 which anchor the brackets 40 to the axle housings. As shown in Fig. 3 of the drawings, the brackets 81 are formed to present a lower flange 82 adapted to rest on the pad 25 and an upward flange 83 for attachment of the fender 26. These flanges are connected by a wedge-shaped web 84 which not only locates the flange 83 substantially above the pad but also inclines it forwardly and upwardly so that the fender is safely held away from the track attachment.

It will be apparent from the foregoing that the invention provides an improved mounting for the idler wheel supporting structure of a tractor track attachment which materially simplifies the work of installing the attachment and particularly the lining up of the idler wheel with the tractor drive wheel. The improved bracket constituting a part of this mounting supports the idler wheel carrying arm and the spring organization for biasing the same. By swiveling the bracket relative to the housing, the idler wheel may be brought into proper alinement with the drive wheel. Such alinement is facilitated by the provision of novel adjustable spacer elements on the U-bolt utilized to clamp the bracket to the axle housing and those spacer elements serve to maintain the entire supporting structure in the selected position of adjustment under the most severe operating conditions to which the tractor is subjected.

I claim as my invention:

1. Means for mounting the idler wheel carrying arm of a tractor track attachment on a tractor rear axle housing having a downwardly facing pad formed intermediate its ends with bolt holes at opposite sides of the axle housing, said mounting means comprising, in combination, an elongated flat bracket plate adapted to seat against the pad on the axle housing and to extend beyond the pad along the axle housing, means rigid with said plate for pivotally supporting an idler wheel carrying arm with the arm extending generally forwardly therefrom, said plate having a pair of holes spaced apart to receive bolts inserted through the holes in the axle housing pad and to be clamped against the pad by such bolts, the holes in said plate being larger in diameter than the bolts to permit a limited swiveling of the plate with respect to the axle housing, a U-bolt adapted to straddle the axle housing, said plate having an additional pair of holes adjacent the end extending along the axle housing spaced apart to receive the legs of said U-bolt, spacer elements on the legs of said U-bolts adjustable to engage opposite sides of the axle housing in selected angular positions of the plate, and nuts threaded on the legs of said U-bolt below said plate for clamping said spacer elements against the axle housing to maintain the plate in the selected angular position.

2. Means for mounting the idler wheel carrying arm of a tractor track attachment on a tractor rear axle housing having a downwardly facing pad formed intermediate its ends with bolt holes at opposite sides of the axle housing, said mounting means comprising, in combination, an elongated flat bracket plate adapted to seat against the pad on the axle housing and to extend beyond the pad along the axle housing, means rigid with said plate for pivotally supporting an idler wheel carrying arm with the arm extending generally forwardly therefrom, said plate having a pair of holes spaced apart to receive bolts inserted through the holes in the axle housing pad and to be clamped against the pad by such bolts, the holes in said plate being larger in diameter than the bolts to permit a limited swiveling of the plate with respect to the axle housing, a U-bolt adapted to straddle the axle housing, said plate having an additional pair of holes adjacent the end extending along the axle housing spaced apart to receive the legs of said U-bolt, a spacer element mounted on each leg of the U-bolt adjacent the upper face of said plate, each of said spacer elements having an aperture for the reception of a U-bolt leg and a plurality of locating faces progressively spaced from the axis of the aperture, said elements being rotatable relative to the U-bolt leg to present selected faces to the axle housing for locating the plate in a predetermined angular position with respect to the housing, and nuts threaded on the U-bolt legs coacting with the bottom face of said plate to clamp it in position.

3. Means for mounting the idler wheel supporting structure of a tractor track attachment on a tractor rear axle housing having a pad upon which a stabilizer bar attaching bracket is normally clamped, said mounting means comprising, in combination, an elongated flat steel plate adapted to be clamped against said pad in place of said bracket, flanges at opposite sides of said plate and projecting beyond the forward edge thereof for pivotally supporting an idler wheel carrying arm, a third flange depending from said plate intermediate said side flanges and disposed substantially parallel therewith, said third flange and one of said side flanges being apertured for the pivotal connection of the stabilizer bar thereto, the rear edge portion of said plate being recessed between said third flange and said one side flange to afford clearance for the swinging of the stabilizer bar.

References Cited in the file of this patent

UNITED STATES PATENTS

| | | |
|---|---|---|
| 1,388,750 | Palmer | Aug. 23, 1921 |
| 1,583,157 | Jett | May 4, 1926 |
| 1,659,297 | Langenfeld | Feb. 14, 1928 |
| 2,587,813 | Bombardier | Mar. 4, 1952 |